I. M. JACOBS, & W. CRAMER.
MEANS FOR CONVERTING STEERING MEANS FOR MOTOR VEHICLES INTO RIGHT OR LEFT HAND DRIVES.
APPLICATION FILED OCT. 26, 1917.

1,299,348.

Patented Apr. 1, 1919.

Inventors:
Isidor M. Jacobs,
William Cramer,
By Hugh K. Wagner,
Attorney.

I. M. JACOBS & W. CRAMER.
MEANS FOR CONVERTING STEERING MEANS FOR MOTOR VEHICLES INTO RIGHT OR LEFT HAND DRIVES.
APPLICATION FILED OCT. 26, 1917.
1,299,348.
Patented Apr. 1, 1919.
2 SHEETS—SHEET 2.
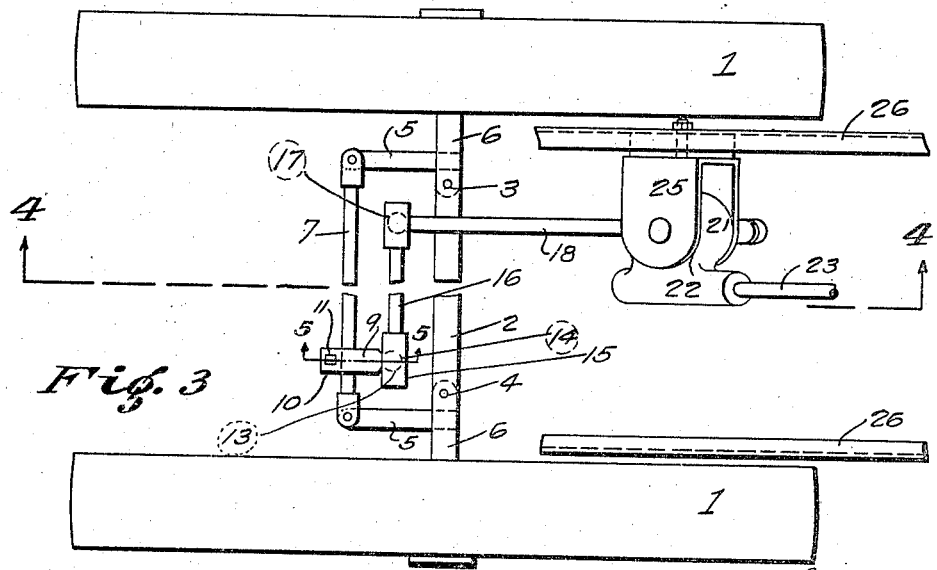
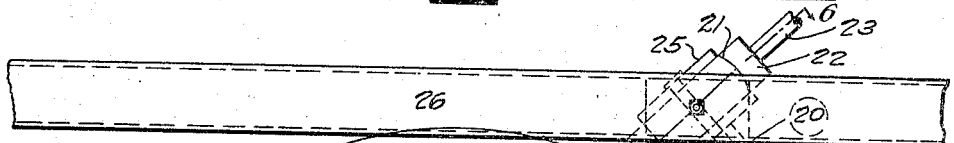
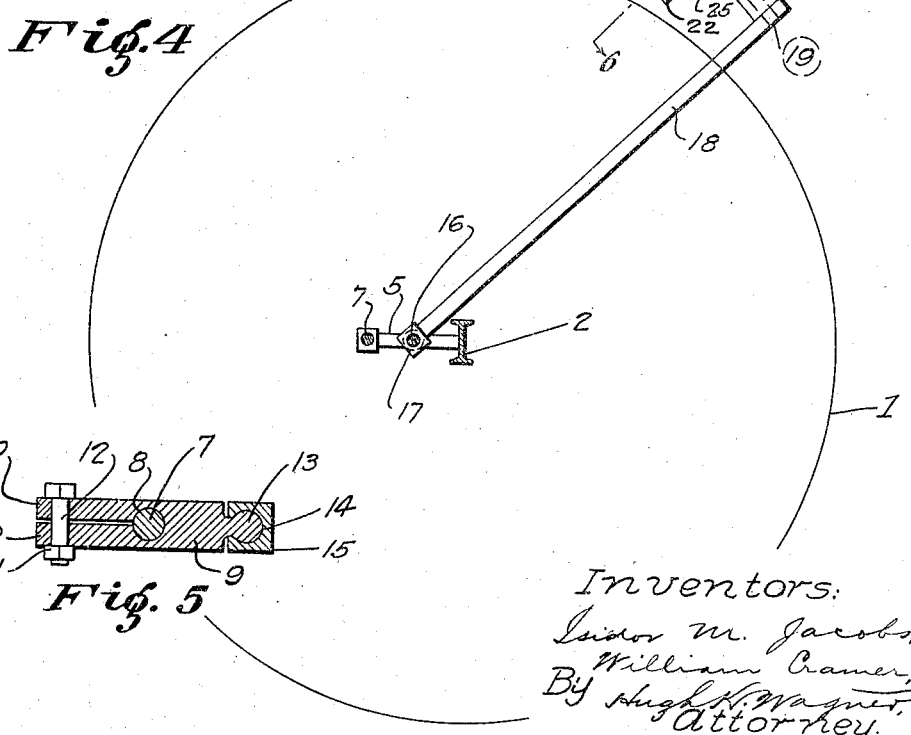

UNITED STATES PATENT OFFICE.

ISIDOR M. JACOBS, OF KANSAS CITY, AND WILLIAM CRAMER, OF ST. LOUIS, MISSOURI, ASSIGNORS, BY MESNE ASSIGNMENTS, TO TRUCK, TRACTOR AND MANUFACTURING COMPANY, OF ST. LOUIS, MISSOURI, A CORPORATION OF MISSOURI.

MEANS FOR CONVERTING STEERING MEANS FOR MOTOR-VEHICLES INTO RIGHT OR LEFT HAND DRIVES.

1,299,348.        Specification of Letters Patent.        Patented Apr. 1, 1919.

Application filed October 26, 1917. Serial No. 198,643.

*To all whom it may concern:*

Be it known that we, ISIDOR M. JACOBS and WILLIAM CRAMER, citizens of the United States, residing at Kansas City, in the county of Jackson and State of Missouri, and St. Louis, State of Missouri, respectively; have invented certain new and useful Improvements in Means for Converting Steering Means for Motor-Vehicles into Right or Left Hand Drives, of which the following is a specification.

This invention, while it may be of general utility, is especially designed in aid of the salvage constructions contemplated by the application for patent, Serial Number 163,652, filed by one of the joint inventors herein named, and has for its object the ready utilization of salvaged motor vehicle parts, whether of right or left hand drive machines.

In the accompanying drawings, forming part of this specification, in which like numbers of reference denote like parts wherever they occur, Figure 1 is a diagrammatic top plan view of the steering mechanism of a motor vehicle;

Fig. 3 is a top plan diagrammatic view showing the same reversed for a drive of the opposite hand;

Fig. 4 is a view taken on the line 4—4 in Fig. 3, looking in the direction of the arrows;

Fig. 5 is a detail sectional view showing means of attachment to the steering rod;

Figure 1:
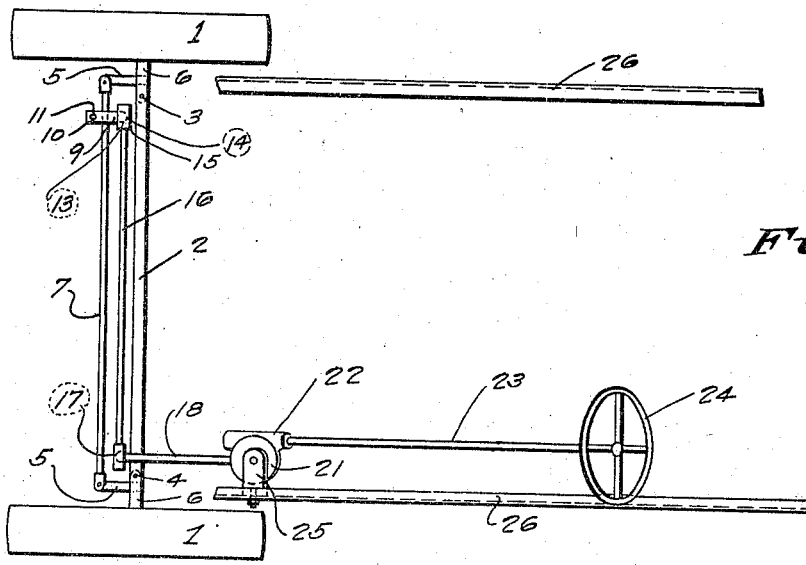

In salvaging motor vehicles and reconstructing the same into trucks, tractors, or tractor-trucks, as described in the above-mentioned application for patent, simple, cheap, and ready means are necessary for adapting the parts on hand to either a right or left hand drive which is hereby provided. The same can also be used in any motor vehicle construction in which such convertibility is desired or necessary.

The front wheels 1 are connected by the axle 2, to which they are pivotally attached at 3 and 4 in the usual manner.

A steering knuckle 5 extends from each of the short shafts 6 and are connected by a rod 7. The rod 7 is slipped through the hole 8 in the member 9 having the pair of jaws 10. Tightening nut 11 on bolt 12 tightens jaws 10 on rod 7 and holds the same fast. Member 9 is provided with the universal head 13, which fits in socket 14 in block 15 mounted on rod 16, which rod 16 has a similar ball and socket connection 17 with rod 18 which is in fixed connection at 19 with a shaft 20 driven by a worm gear contained within housing 21, which worm gear is driven by a worm contained within housing 22. The said worm is turned in one direction or the other by steering post 23 moved by steering wheel 24.

The gear housing 21 and gear contained therein is supported by bracket 25 from chassis 26. When the steering wheel 24 is turned in one direction, the worm within the housing 22 actuates the worm gear within the housing 21, which swings rod 18 in an arc having its center at the center of the shaft 20, and with it rod 7, which thereby turns the wheels 1 on their pivots 3 and 4 in the respective direction according to the direction in which the rod 18 is swung.

Figure 2:
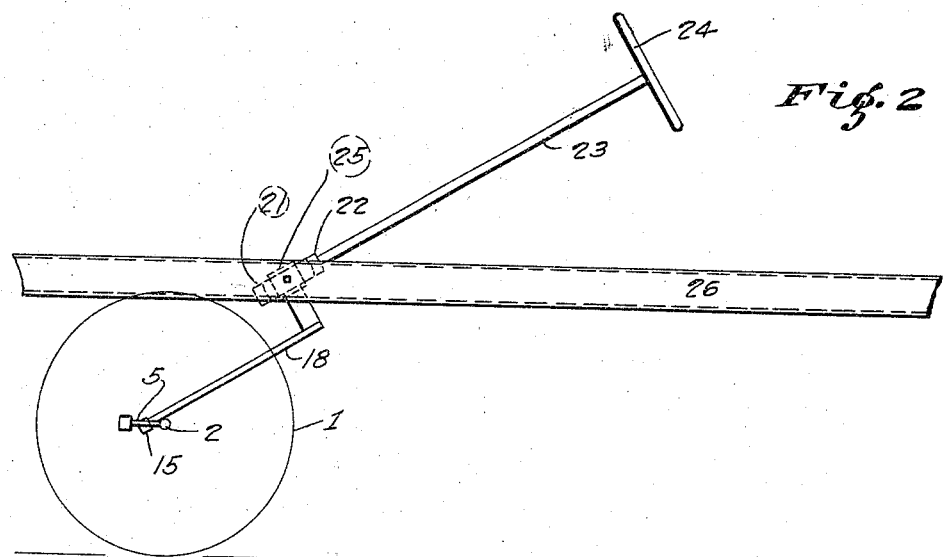
Fig. 2 is a side elevation of the same.
Figure 6:
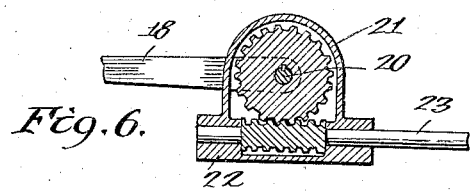
Fig. 6 is a horizontal sectional detail on an enlarged scale, on the line 6—6 in Fig. 4, showing the worm and gear, but omitting the bracket.

Fig. 3 is upon a slightly enlarged scale as compared to Fig. 1, and so is Fig. 4 as compared to Fig. 2.

Figs. 3 and 4 merely show the arrangement of Fig. 1 reversed to put the steering wheel upon the right for a right hand drive instead of on the left as in Figs. 1 and 2 for a left hand drive. The simplicity of the arrangements for this purpose and its suitability for the contemplated purpose will be readily appreciated.

Having thus described this invention, we hereby reserve the benefit of all changes in form, arrangement, order, or use of parts, as it is evident that many minor changes may be made therein without departing from the spirit of this invention, or the scope of the following claim.

Claim:

A steering mechanism of the type described, including stub-wheel axles pivotally connected to the intermediate axle proper, a rod-member having knuckle-connection with said stub-axles, a controlling rod, a clamp between said rods, a third rod, a hand-actuated shaft, said clamp and said third rod having ball and socket connections with said controlling rod at its opposite ends, said hand-actuated shaft and said third rod being entergeared together, the intergeared mechanism comprising a pinion whose shaft is fast to said third rod, and a worm integral with said hand-actuated shaft, the shaft of said pinion together with said intergeared mechanism forming a right-angled connection between said third rod and said hand-actuated shaft.

In testimony whereof we hereunto affix our signatures.

ISIDOR M. JACOBS.
WILLIAM CRAMER.

Copies of this patent may be obtained for five cents each, by addressing the "Commissioner of Patents, Washington, D. C."